(12) United States Patent
Takahashi et al.

(10) Patent No.: US 9,643,600 B2
(45) Date of Patent: May 9, 2017

(54) VEHICLE CONTROL SYSTEM

(71) Applicant: HITACHI AUTOMOTIVE SYSTEMS, LTD., Hitachinaka-shi, Ibaraki (JP)

(72) Inventors: Akira Takahashi, Sagamihara (JP); Jun Kubo, Hino (JP); Mitsuo Sasaki, Hadano (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 14/893,680

(22) PCT Filed: May 27, 2014

(86) PCT No.: PCT/JP2014/063920
§ 371 (c)(1),
(2) Date: Nov. 24, 2015

(87) PCT Pub. No.: WO2014/192719
PCT Pub. Date: Dec. 4, 2014

(65) Prior Publication Data
US 2016/0107640 A1    Apr. 21, 2016

(30) Foreign Application Priority Data
May 31, 2013    (JP) .................................. 2013-116319

(51) Int. Cl.
| | |
|---|---|
| *B62D 11/00* | (2006.01) |
| *B62D 5/04* | (2006.01) |
| *B60W 30/02* | (2012.01) |
| *B60W 10/20* | (2006.01) |
| *B60W 30/12* | (2006.01) |

(Continued)

(52) U.S. Cl.
CPC ............... *B60W 30/02* (2013.01); *B60T 7/12* (2013.01); *B60T 8/17* (2013.01); *B60T 8/1755* (2013.01); *B60T 8/17557* (2013.01); *B60W 10/18* (2013.01); *B60W 10/184* (2013.01); *B60W 10/20* (2013.01); *B60W 30/12* (2013.01); *B62D 6/00* (2013.01); *B62D 15/025* (2013.01); *G05D 1/0212* (2013.01); *G06K 9/00798* (2013.01); *B60T 2260/02* (2013.01);
(Continued)

(58) Field of Classification Search
USPC ............................................. 701/41; 180/443
See application file for complete search history.

(56) References Cited

U.S. PATENT DOCUMENTS

| | | |
|---|---|---|
| 2006/0142922 A1 | 6/2006 | Ozaki et al. |
| 2008/0047775 A1* | 2/2008 | Yamazaki ............ B62D 5/0463 180/443 |

(Continued)

FOREIGN PATENT DOCUMENTS

| | | |
|---|---|---|
| JP | 2004-034792 A | 2/2004 |
| JP | 2004-345460 A | 12/2004 |

(Continued)

*Primary Examiner* — Tyler Paige
(74) *Attorney, Agent, or Firm* — Foley & Lardner LLP

(57) ABSTRACT

To provide a vehicle control system capable of promptly achieving a travel motion along a travel path. A yaw moment control amount is imparted according to a traveling-direction virtual line extending from an ego vehicle in a traveling direction and a formed angle between the traveling-direction virtual line and a travel-path defining line.

15 Claims, 15 Drawing Sheets

(51) Int. Cl.
*B62D 15/02* (2006.01)
*B60T 8/1755* (2006.01)
*B60W 10/184* (2012.01)
*B62D 6/00* (2006.01)
*B60T 8/17* (2006.01)
*B60W 10/18* (2012.01)
*B60T 7/12* (2006.01)
*G05D 1/02* (2006.01)
*G06K 9/00* (2006.01)

(52) U.S. Cl.
CPC ... *B60W 2520/10* (2013.01); *B60W 2550/146* (2013.01); *B60W 2720/14* (2013.01)

(56) References Cited

U.S. PATENT DOCUMENTS

| | | |
|---|---|---|
| 2011/0276227 A1 | 11/2011 | Sugawara et al. |
| 2012/0140039 A1 | 6/2012 | Ota et al. |
| 2013/0190985 A1* | 7/2013 | Nakano ................... B62D 6/00 701/41 |

FOREIGN PATENT DOCUMENTS

| | | |
|---|---|---|
| JP | 2006-182308 A | 7/2006 |
| JP | 2010-009361 A | 1/2010 |
| JP | 2010-089701 A | 4/2010 |
| JP | 2011-073530 A | 4/2011 |
| JP | 2012-123495 A | 6/2012 |
| JP | 2012-131428 A | 7/2012 |
| JP | 2013-018326 A | 1/2013 |

* cited by examiner

VEHICLE CONTROL SYSTEM

TECHNICAL FIELD

The invention relates to a vehicle control system configured to recognize a travel environment in which a vehicle travels, and provide drive assist.

BACKGROUND ART

Patent Document 1 discloses the technology of calculating a target yaw rate from an ego vehicle's travel locus and a travel locus along the recognized road edge, and controlling a steering actuator so that an actual yaw rate equals the target yaw rate.

CITATION LIST

Patent Document

Patent Document 1: Japanese Unexamined Patent Application Publication (Kokai) No. 2004-345460

SUMMARY OF INVENTION

Technical Problem

The above-mentioned conventional technology calculates the target yaw rate by dividing a formed angle between the travel locus along the recognized road edge and a traveling-direction virtual line extending from the ego vehicle in the traveling direction by the length of time before arrival to the edge of the road. The yaw rate is then corrected by degrees as the vehicle approaches the road edge. This causes the problem that it takes long to achieve travel motion along the road edge.

It is an object of the invention to provide a vehicle control system capable of promptly achieving a travel motion along an edge of a road.

Solution to Problem

To accomplish the above object, the invention imparts a yaw moment control amount according to the traveling-direction virtual line extending from the ego vehicle in the traveling direction and the formed angle between the traveling-direction virtual line and a travel-path defining line.

DESCRIPTION OF EMBODIMENTS

Embodiment 1

Figure 1:
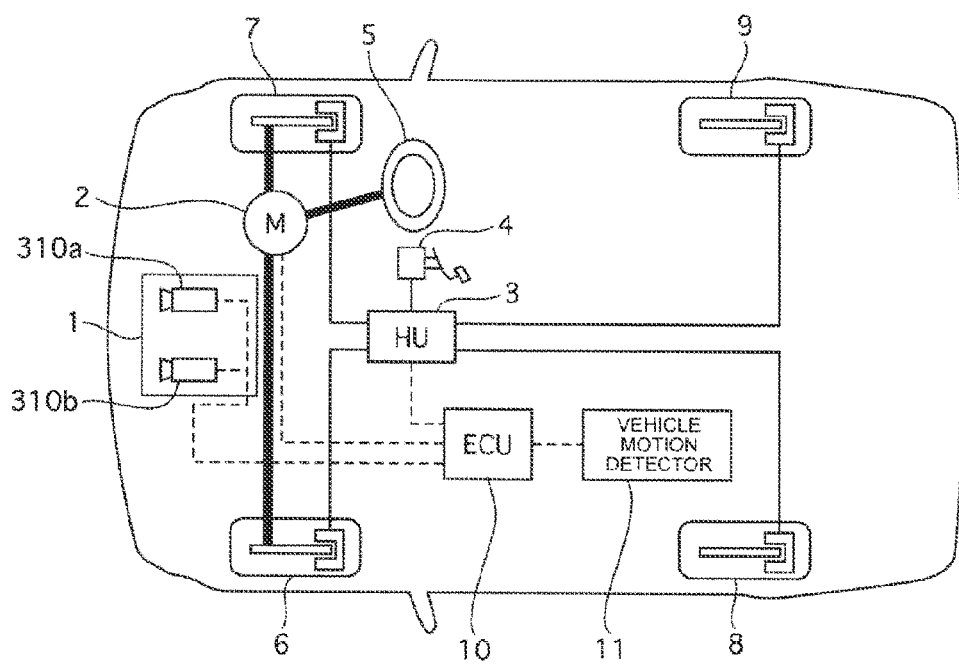
FIG. 1 is a schematic configuration view showing a vehicle control system of an Embodiment 1.

FIG. 1 is a schematic configuration view showing a vehicle control system of an Embodiment 1.

A vehicle of the Embodiment 1 includes a travel environment recognition system 1, an electrically-assisted power steering 2, a hydraulic brake unit 3, a brake booster 4, a steering wheel 5, a front left wheel 6, a front right wheel 7, a rear left wheel 8, a rear right wheel 9, an electronic control unit 10, and a vehicle motion detector 11.

The travel environment recognition system 1 takes an image of a view ahead of an ego vehicle by using stereo cameras 310a and 310b placed in a substantially middle position in the vicinity of a rearview mirror located in an upper front portion in an interior of the ego vehicle, and creates travel environment data.

The electrically-assisted power steering 2 calculates an assist torque on the basis of a command according to a driver steering torque and a steering angle or steering angle speed of the steering wheel 5, assists the steering torque by means of an electric motor, and turns the front right and left wheels 6 and 7. The electrically-assisted power steering 2 further executes steering-torque assist control which applies yaw moment to a vehicle through after-mentioned vehicle attitude stabilizing control. It is possible to employ a steer-by-wire system capable of turning the front right and left wheels 6 and 7 independently of a driver's steering wheel operation. There is no particular limitation.

The hydraulic brake unit 3 independently controls wheel-cylinder pressure which applies a braking torque to the four wheels according to a driver's brake operation force or a vehicle condition. The hydraulic brake unit 3 may be a VDC unit which carries out vehicle behavior control, such as vehicle dynamics control and vehicle stability control, which are existing controls. Alternatively, the hydraulic brake unit 3 may be a unique hydraulic unit. There is no particular limitation.

The brake booster 4 is a booster which boosts a driver's brake pedal force with respect to a piston in a master cylinder, which is activated by the brake pedal, and thus electrically assists a stroke force of the piston. Master-cylinder pressure is generated by the force boosted by the brake booster 4, and outputted to the hydraulic brake unit 3. The brake booster 4 does not have to be configured to electrically assist the force, and may be a negative-pressure booster using negative pressure of an engine. There is no particular limitation.

The vehicle motion detector 11 detects the speed of vehicle (vehicle speed), longitudinal acceleration, lateral acceleration, yaw rate, steering angle, steering torque, and the like.

The electronic control unit 10 controls the travel environment recognition system 1, the electrically-assisted power steering 2, and the hydraulic brake unit 3 in accordance with detection values of the vehicle motion detector 11. When a travel-path defining line which defines a travel path on a road recognized from an image taken by the travel environment recognition system 1 and a traveling direction of the ego vehicle (traveling-direction virtual line extending from the ego vehicle in the traveling direction, for example) intersect with each other, the electronic control unit 10 activates the electrically-assisted power steering 2 and/or the hydraulic brake unit 3, and applies the yaw moment and/or deceleration to the vehicle, to thereby carry out the vehicle attitude stabilizing control so that the traveling direction of the vehicle and a traffic lane are parallel to each other. The "travel-path defining line" here means a center line, a traffic lane line if white lines are recognized, a line connecting positions where guardrails are installed if guardrails are recognized, a line or the like indicating a boundary between a flat area and a slope area of a road embankment (hereinafter, also simply referred to as a "road edge"). The vehicle attitude stabilizing control will be later described in details.

If driven by the driver's brake operation force, the hydraulic brake unit 3 applies equal braking forces to the front right and left wheels 6 and 7 and to the rear right and left wheels 8 and 9. According to the vehicle attitude stabilizing control, right and left braking forces are generated while the braking forces are differentiated between the front right and left wheels 6 and 7 and between the rear right and left wheels 8 and 9, to thereby apply the yaw moment to the vehicle.

(Vehicle Attitude Stabilizing Control System)

Figure 2:
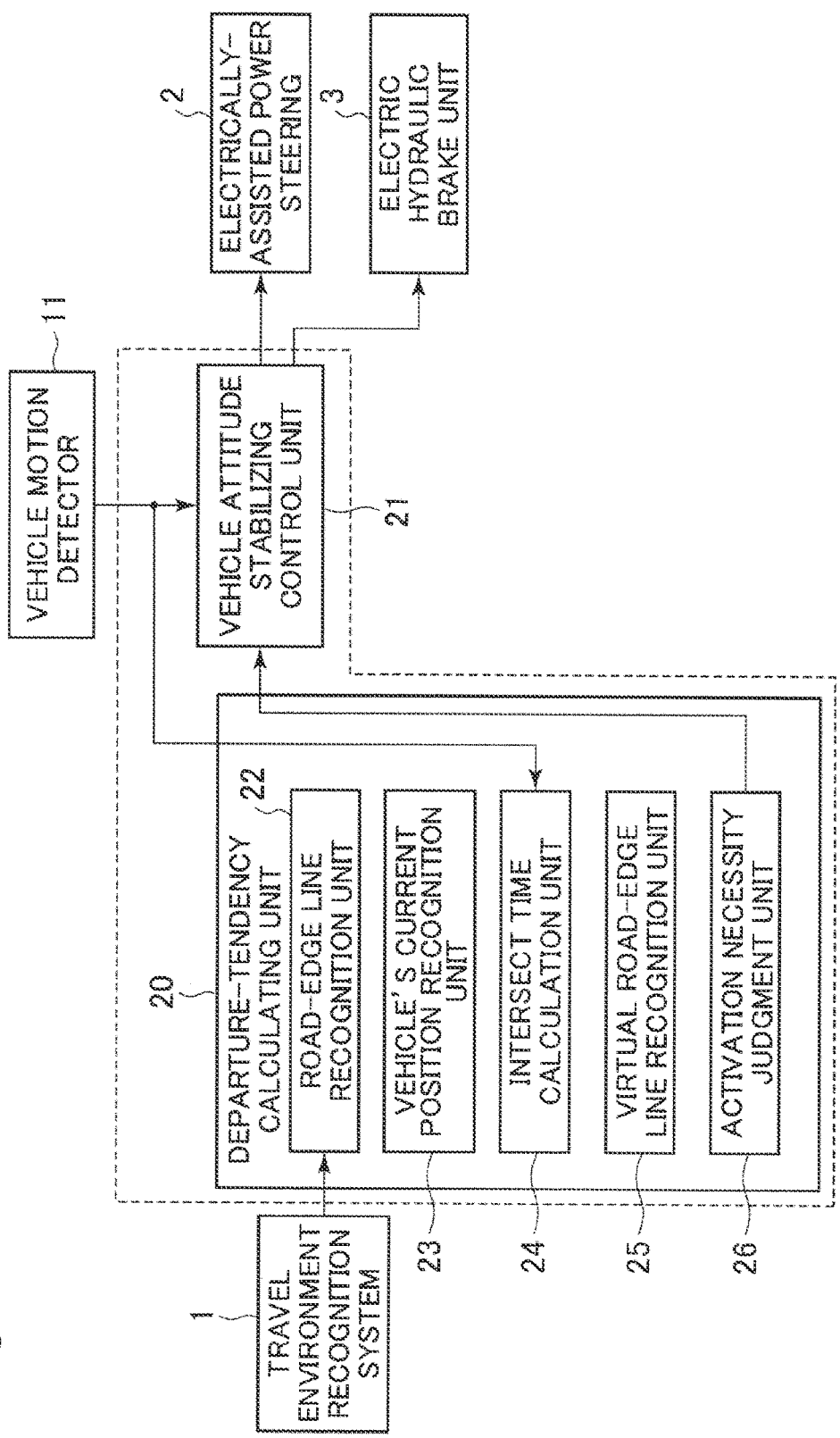
FIG. 2 is a control block diagram of an electronic control unit of the Embodiment 1.

FIG. 2 is a control block diagram of an electronic control unit 10 of the Embodiment 1. The electronic control unit 10 includes a departure-tendency calculating unit 20 and a vehicle attitude stabilizing control unit 21. The departure-tendency calculating unit 20 calculates a lane departure tendency of a vehicle. The vehicle attitude stabilizing control unit 21 activates the electrically-assisted power steering 2 and/or the hydraulic brake unit 3 when the departure-tendency calculating unit 20 detects the departure tendency of the vehicle from the driving lane. The vehicle attitude stabilizing control unit 21 thus applies a yaw moment and/or deceleration to the vehicle to suppress the departure tendency. The vehicle attitude stabilizing control unit 21 makes the ego vehicle parallel to the travel-path defining line in accordance with the traveling-direction virtual line extending from the ego vehicle in the traveling direction, an angle formed by the traveling-direction virtual line and a virtual travel-path defining line which is in a direction of tangent to the travel-path defining line, at a position where the traveling-direction virtual line and the travel-path defining line intersect (hereinafter, referred to as a "formed angle θ". See FIGS. 14 and 15), and a turning condition of the ego vehicle.

The departure-tendency calculating unit 20 includes a travel-path defining line recognition unit (road-edge line recognition unit) 22, a vehicle's current position recognition unit 23, an intersect time calculation unit 24, a virtual travel-path defining line calculation unit (virtual road-edge line recognition unit) 25, and an activation necessity judgment unit 26.

The travel-path defining line recognition unit 22 recognizes boundary lines (including a center line) of road edges existing on right and left sides of a traffic lane on which the ego vehicle travels, which include white lines, guardrails and curbs, from an image of a view ahead of the ego vehicle, which is taken by the travel environment recognition system 1.

The vehicle's current position recognition unit 23 recognizes a current position of a vehicle, which is a forward end of the vehicle as viewed in a traveling direction of the ego vehicle, and also recognizes the traveling-direction virtual line from the vehicle's current position in the traveling direction of the ego vehicle. The current position of the vehicle may be a substantially central position of the ego vehicle, instead of the forward end of the vehicle as viewed in the traveling direction. If the ego-vehicle traveling direction (traveling-direction virtual line) intersects with a travel-path defining line on the right, a right forward position of the ego vehicle may be the current position of the vehicle. If the ego-vehicle traveling direction intersects with a travel-path defining line on the left, a left forward position of the ego vehicle may be the current position of the vehicle. The current position of the vehicle may also be set at a position located with leeway as compared to the position of the actual end of the vehicle. There is no particular limitation.

The intersect time calculation unit 24 computes an intersect time, namely, a time period in which the ego vehicle travels at current speed from the vehicle's current position to an intersection of the traveling-direction virtual line and the travel-path defining line.

The virtual travel-path defining line calculation unit 25 calculates the virtual travel-path defining line which is in the direction of tangent to the travel-path defining line at the intersection of the travel-path defining line and the traveling-direction virtual line. If there are a plurality of intersections of the travel-path defining line and the traveling-direction virtual line in the traveling direction of the ego vehicle, the virtual travel-path defining line calculation unit 25 calculates the virtual travel-path defining line which is in the direction of tangent at an intersection point closest to the ego vehicle.

The activation necessity judgment unit 26 makes a judgment on the basis of the intersect time as to whether the activation of the vehicle attitude stabilizing control is necessary, that is, whether control intervention by the vehicle attitude stabilizing control should be carried out. More specifically, a judgment is made as to whether the intersect time is equal to or longer than predetermined time. If the intersect time is equal to or longer than the predetermined time, it is judged that safety is secured, that there is no need for control intervention, and that the vehicle attitude stabilizing control is unnecessary. To the contrary, if the intersect time is shorter than the predetermined time, it is judged that the vehicle attitude stabilizing control is necessary.

If it is judged by the activation necessity judgment unit 26 that the vehicle attitude stabilizing control is necessary, the vehicle attitude stabilizing control unit 21 conducts the vehicle attitude stabilizing control. If judged unnecessary, the vehicle attitude stabilizing control is not conducted.

(Recognition of the Travel-Path Defining Line)

Figure 3:
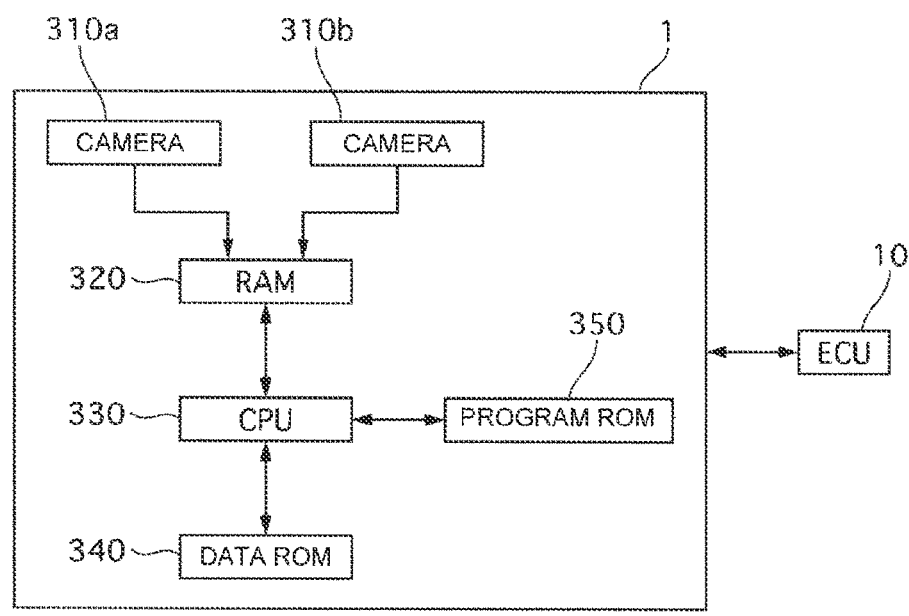
FIG. 3 is a block diagram showing a configuration of a travel environment recognition system of the Embodiment 1.

The recognition of the travel-path defining line will be explained in details. FIG. 3 is a block diagram showing a configuration of a travel environment recognition system of the Embodiment 1. The travel environment recognition system 1 is provided with a stereo camera 310 comprising a pair of cameras 310a and 310b as an image-taking device, and recognizes environment around a vehicle. According to the Embodiment 1, the cameras are installed at the same distance from the center of the vehicle in a vehicle-width direction. It is possible to install three or more cameras. The description of the Embodiment 1 refers to a configuration in which images taken by the cameras are processed in the travel environment recognition system 1. Image processing or the like may be executed by another controller.

The travel environment recognition system 1 is configured to obtain distance to an object captured in an image on the basis a triangulation principle using difference in vision (hereinafter, referred to as "disparity") which occurs when an image is taken by the plurality of cameras 310a and 310b. For example, a relational expression below is true, where Z denotes distance to the object; B denotes distance between the cameras; f denotes a focal length of the cameras; and δ is disparity.

$$Z=(B \times f)/\delta$$

The travel environment recognition system 1 includes a RAM 320 which stores images taken, a CPU 330 which executes computational processing, a data ROM 340 which stores data, and a program ROM 350 in which a recognition processing program is stored. The stereo camera 310 is fixed to a rearview mirror portion in a vehicle interior and configured to take the image of the view ahead of the ego vehicle at a predetermined depression angle at the fixed position. The image of the view ahead of the ego vehicle, which is taken by the stereo camera 310 (hereinafter, referred to as an "image taken") is scanned into the RAM 320. The CPU 330 executes the recognition processing program stored in the program ROM 350 with respect to the image taken which is scanned into the RAM 320, to thereby detect a traffic lane and a three dimensional object ahead of the ego vehicle, and estimate a road configuration. A result of the estimation by the CPU 330 (computation result) is outputted to the data ROM 340 and/or ECU 10.

Figure 4:
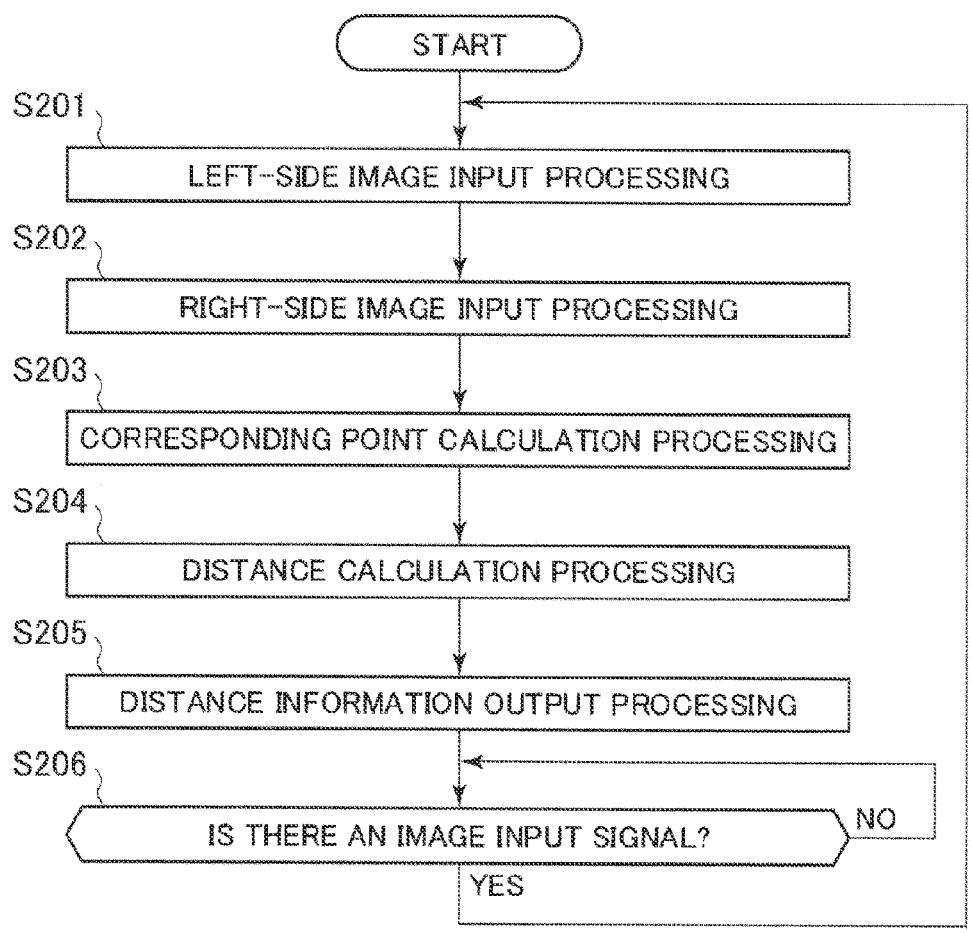
FIG. 4 is a flowchart showing image processing in the travel environment recognition system of the Embodiment 1.

FIG. 4 is a flowchart showing image processing in the travel environment recognition system of the Embodiment 1.

Step 201 executes processing of inputting images taken by the camera 310a situated on the left. Data of the images taken by the camera 310a are inputted into the RAM 320.

Step 202 executes processing of inputting images taken by the camera 310b situated on the right. Data of the images taken by the camera 310b are inputted into the RAM 320.

In Step 203, the CPU 330 executes processing of calculating corresponding points captured in the images.

In Step 204, the CPU 330 executes processing of calculating distance to the calculated corresponding points. The distance calculation processing is carried out on the basis of the relational expression, $Z=(B \times f)/\delta$. Step 205 executes processing of outputting distance information.

In Step 206, the CPU 330 makes a judgment as to presence of an image input signal. If there is the image input signal, the routine returns to Step 201 and repeats the present flow. If there is no image input signal, the routine terminates the computation processing and enters a wait state.

(Recognition Processing on a Road with a Steep Slope)

Figure 5:
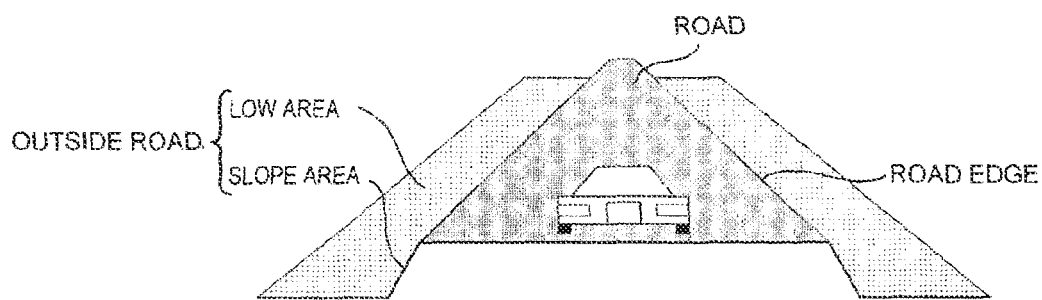
FIG. 5 is a diagrammatic illustration schematically showing a road embankment with steep slope areas.
Figure 6:
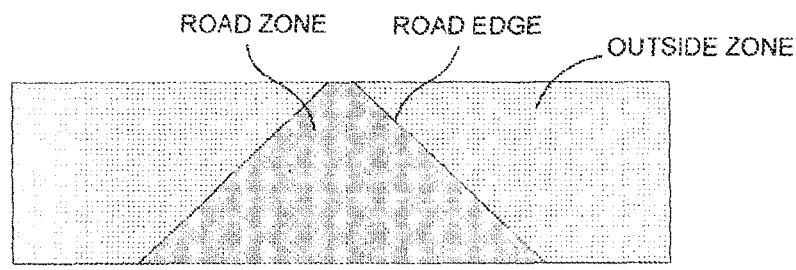
FIG. 6 is an image schematically showing a screen image of a road embankment with steep slope areas, which is taken from an ego vehicle.

The following description explains image processing in a case where outside zones located outside a road (such as both sides of the road on which the ego vehicle travels) are lower than a road surface. FIG. 5 is a diagrammatic illustration schematically showing a road embankment with steep slope areas. In this road embankment, a road is formed on an upper side portion of an embankment having a substantially trapezoidal cross-section. Between the road and the outside zone, a slope area is formed, and outside the slope area is a low area. Hereinafter, the road is also referred to as a "road surface". FIG. 6 is an image schematically showing a screen image of the road embankment with steep slope areas, which is taken from the ego vehicle. In this image taken, the road edge which is the travel-path defining line and the outside areas (zones lower than the road surface) are in abutment with each other in the image taken. In the case of this road, the slope has an angle larger than the depression angle of the stereo camera 310 (slope is steep), so that a dead zone (portion which is not captured in an image) is created, and the slope area is not captured on a screen. As the result, the road edge and the low areas are in abutment with each other in the image taken. To solve this, a road zone and another zone indicating the low area are detected on the screen, and among boundaries between these zones on the screen, a road side is extracted as an actual road edge, to thereby achieve detection reflecting an actual road environment.

(Improvement of Accuracy in Image Processing)

Figure 7:
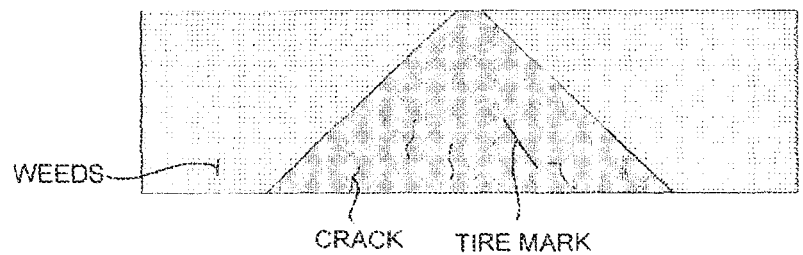
FIG. 7 is a diagrammatic illustration showing characteristic points captured in an image at the same time when the image of an actual road is taken.

If the road and the outside zones are visually completely homogenous, it is difficult to extract a certain place in the same zone in images taken by the two cameras. FIG. 7 is a diagrammatic illustration showing characteristic points captured in an image at the same time the image of an actual road is taken. As illustrated in FIG. 7, in many places on the actual road, there are visually characteristic points throughout the road including particles of asphalt concrete used to surface roads, road markings, joints and cracks in asphalt, tire marks left by traveling vehicles, and also tracks even in unsurfaced roads. In the zones lower than the road, visually characteristic points such as weeds are throughout the zone. In other words, there is a visual difference between the road surface provided with surfacing or land adjustment for the traveling of vehicles and the zones lower than the road surface, which are not provided with such treatment. A boundary portion between the road surface and the lower zone is highly likely to be visually noticeable.

Since there are many visually characteristic points on the road, the outside areas, and the boundaries therebetween, it is possible to make a comparison of these zones with one another within the images taken by the cameras 310a and 310b, calculate a direction and distance from the cameras 310a and 310b, and find a position of each characteristic point. This makes it possible to understand that an aggregate of the characteristic points on the road lies in substantially the same plane and that the characteristic points on the areas lower than the road are located on the outside zones.

(Overlay Processing)

Concerning a road surface configuration, a characteristic point on the screen, such as not only a road marking but a small crack and a tire mark on the road, is extracted from the images of the view ahead of the ego vehicle, which are taken by the stereo camera 310. On the basis of a position gap of the images taken by the two cameras on the screen, distance to the point is measured. On the other hand, characteristic points do not always evenly exist on the entire road surface. Even if they do exist, it is unsure whether the characteristic points can be detected all the time. Also in the zones lower than the road surface, the characteristic points are not necessarily detectable in every place of the zones. It is then required to further improve accuracy. To that end, the obtained distance data are accumulated in the data ROM 340 and overlaid on data obtained from the image taken with a subsequent or later timing.

Figure 8:
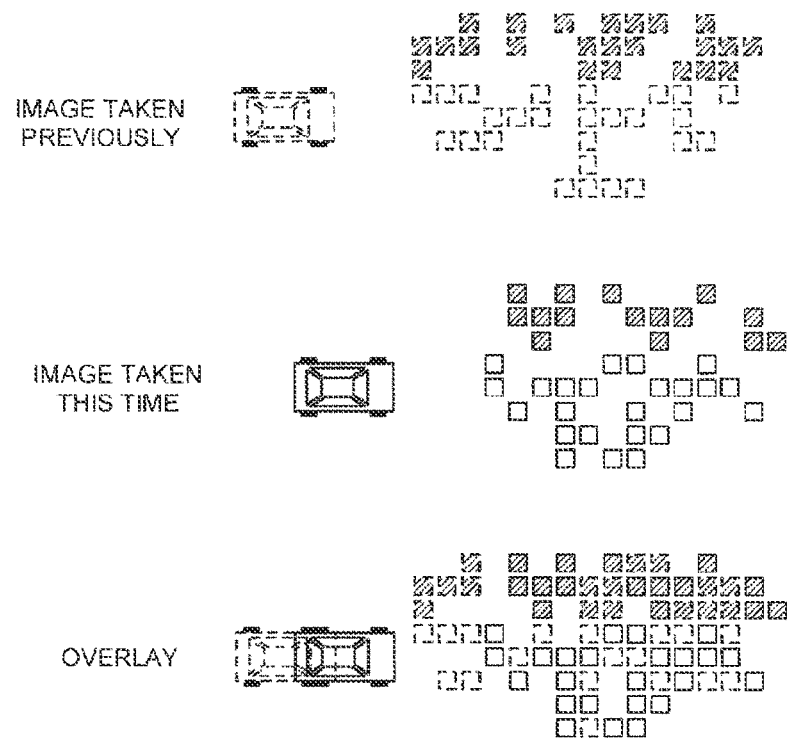
FIG. 8 is a diagrammatic illustration showing image-data overlay processing in the Embodiment 1.

FIG. 8 is a diagrammatic illustration showing the image-data overlay processing in the Embodiment 1. For example, a portion recognizable from the image previously taken is overlaid on a portion recognizable from the image taken this time. If there is a place about which distance information cannot be obtained from the image previously taken, it is possible to improve accuracy in detection of roads and environment by overlaying the distance information newly obtained from the image taken this time. As illustrated in FIG. 8, even if the ego vehicle is traveling, and the images obtained vary over time, a plurality of images are of the same zone if image-taking intervals are short because travel distance is short due to the vehicle speed. It is therefore only required to overlay the zones of the same zone on each other. Overlaying is not limited to two images. It is effective to overlay as many images as possible on one another.

If the images taken have different distance data with respect to a position recognized as the same place, priority may be given to newer data. The use of the newer data improves accuracy in recognition. An average of a plurality of data may also be used. This eliminates an effect of disturbance included in the data and the like, and stabilizes the recognition. It is also possible to extract data which does not much vary from other proximate data. This enables computation based on stable data and improvement in recognition accuracy. There are various methods of processing as described above. It is possible to combine the methods or employ any one of the methods.

(Road Edge Recognition Processing)

Figure 9:
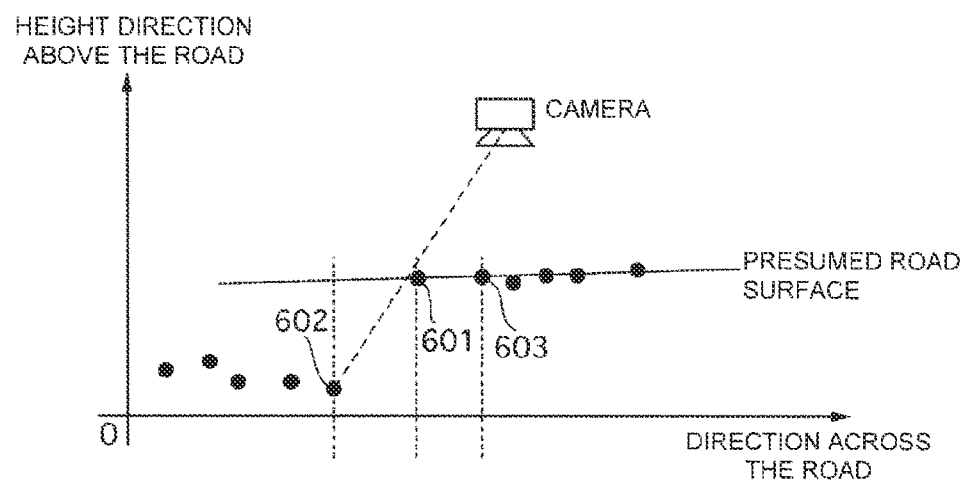
FIG. 9 is a pattern diagram showing a result of recognition obtained by taking an image of a road embankment, in a direction across the road.

FIG. 9 is a pattern diagram showing a result of recognition obtained by taking an image of a road embankment, as viewed in a direction across the road. In this case, the slope area is steep and out of the camera view. The slope area is therefore not captured in the image taken. In the screen image, it looks as if the road area and the area lower than the road directly abut on each other. In fact, however, a point 601 of the road edge and a point 602 of the outside area, which are in abutment with each other on the screen, do not abut on each other but are actually slightly separated from each other as illustrated in FIG. 9. To output that the point of the road edge is the position of the point 602 is inaccurate, so that the point 601 is outputted as the point of the road edge.

Referring to FIG. 9, let us assume that the data of the position corresponding to the point 601 is not detected, and for example, a point 603 located further on the inner side of the road than the point 601 is detected to be an endmost point among points existing on the road surface. In this case, an area between the zone corresponding to the point 602 and the zone corresponding to the point 603 is a zone which is not captured in the image also on the screen. It is then unclear as to where in the area between the zones the road edge is located. At the same time, since the point 602 located in the area lower than the road surface is observable, it can be inferred that no road exists in a direction looking down at the point 602 from the stereo camera 310. It can be therefore inferred that the road edge exists at least in the zone between the point 603 and the point 601 which is not detected in this case. For this reason, the position located between the points 603 and 602 and closer to the road than the position corresponding to the boundary portion is outputted as the road edge.

(Road Edge Recognition Processing on a Road with a Moderate Slope)

Figure 10:
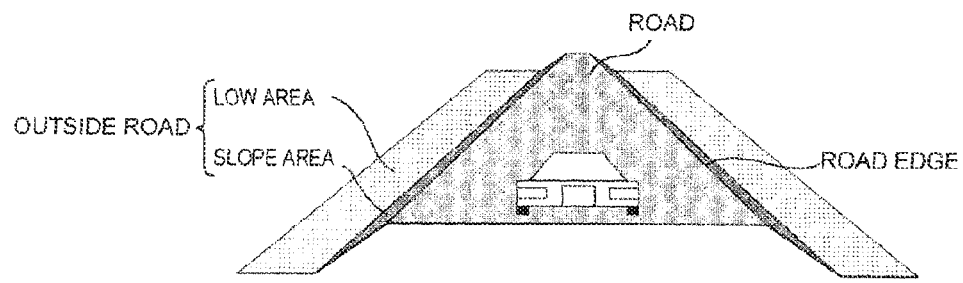
FIG. 10 is a diagrammatic illustration schematically showing a road embankment with moderate slope areas.
Figure 11:
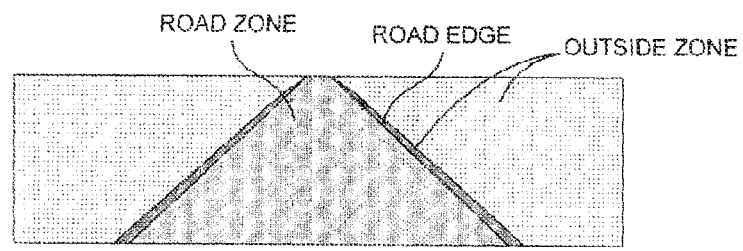
FIG. 11 is an image schematically showing a screen image of a road embankment with moderate slope areas, which is taken from the ego vehicle.

FIG. 10 is a diagrammatic illustration schematically showing a road embankment with moderate slope areas. In this road embankment, a road is formed in an upper portion of an embankment having a substantially trapezoidal cross-section. Between the road and the outside zone, a slope area is formed, and outside the slope area is a low area. FIG. 11 is an image schematically showing a screen image of a road embankment with moderate slope areas, which is taken from the ego vehicle. In this image taken, the road edge and each of the slope areas are captured in the image so as to be in abutment with each other, and the slope areas and the outside area (zone lower than the road surface) are captured in the image so as to be in abutment with each other. In the case of this road, the slope has an angle smaller than the depression angle of the stereo camera 310 (slope is moderate), so that a dead zone (zone which is not captured in an image) is not created.

Figure 12:
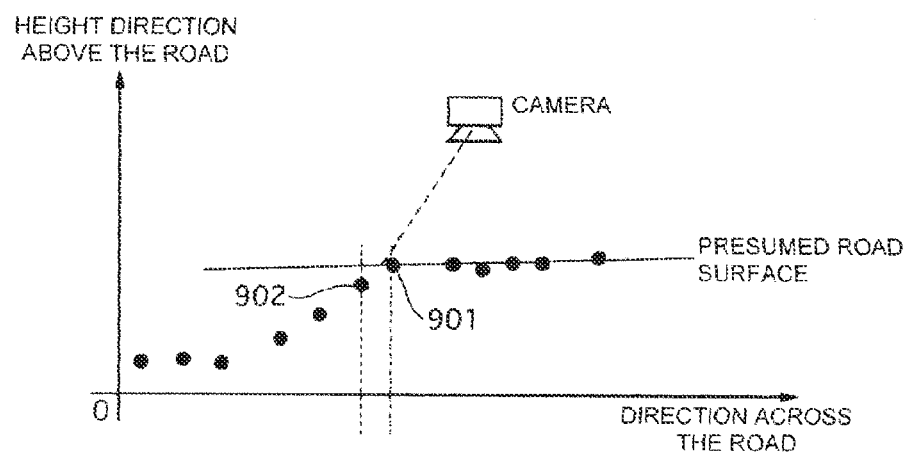
FIG. 12 is a pattern diagram showing a result of recognition obtained by taking an image of a road embankment, in a direction across the road.

FIG. 12 is a pattern diagram showing a result of recognition obtained by taking an image of a road embankment with moderate slopes, as viewed in a direction across the road. In this case, the slope is moderate and captured in the image. In the screen image, it looks as if a road area and a slope area are in abutment with each other, and the slope area and an area lower than the road are in abutment with each other. What is important here is to recognize the road edge. There is no need to distinct the slope area and the low area from each other. Therefore, points which are not located at the same level as the road surface are considered to be located outside the road. As the result, a point 901 is recognized as the edge of the road zone, and a point 902 as a point located closest to the road within the outside zone. It can be then inferred that the actual road edge exists between the points 901 and 902.

(Improvement of Accuracy in Recognition of the Road Edge)

If the road and the outside area are connected to each other with a moderate inclination intervening therebetween, the inclined portion can be imaged by the stereo camera 310 to obtain the distance information thereof. This makes it possible to detect that the inclined portion is a slope area that is not suitable for a vehicle to pass along, and also consider that a boundary between the inclined area and the road area is a road boundary (namely, a road edge).

Even if the zone lower than the road is considerably low and therefore impossible to be detected, for example, as in a case where the road is formed along a precipitous cliff or where contrast between a road and a zone on the side of the road is weak, it is still possible to recognize that the lower zone is outside the road.

Although the detected road edge is expected to be the actual edge of the road, there actually is a gap due to a detection error. Because a road edge has a weak base structure, it is sometimes inappropriate to drive along the road edge. An effective way to cope with such possibilities is to output as a road edge a position located further on the inner side of the road than the detected road edge, as necessary. Contrary to the foregoing case, when the vehicle attitude stabilizing control system is used in combination as in the Embodiment 1, it is effective to output as a road edge a position located further on the outer side of the road than the road edge, as necessary, from the standpoint of prevention of excessive control or warning.

(Handling During Virtual-Image Photographing)

The following is a case where the presence of a zone lower than a road is extracted, and the zone is judged to be located outside the road. When there is a puddle of water in the road, and a virtual image reflected on the puddle is detected, the virtual image is seemingly located lower than the road surface, so that the puddle zone is likely to be incorrectly recognized as a zone lower than the road surface. The virtual image reflected on the puddle has characteristics different from those of a real image, and is therefore excluded in distinction from zones which are actually lower than the road surface. To be more specific, the characteristics are as listed below.

a) A virtual image is created by a distant object being reflected. Therefore, there is a road surface zone, which looks closer than apparent distance of the virtual image, at a point farther than a zone in which the virtual image exists on the screen.

b) Because a water surface is not completely flat, the virtual image is sometimes significantly distorted, which generates variation in distance of the puddle zone.

c) If the water surface is unstable, the apparent position of the virtual image varies with time.

d) It looks as if there is an object in a symmetrical position to an object on the road, across the road surface (water surface).

e) If the virtual image is of a traveling vehicle, the image moves despite that it is located in the zone lower than the road surface.

The virtual image has the foregoing characteristics which are highly unlikely to be seen with real images. Detection of the foregoing characteristics makes it possible to determine that the image is not a real image but a virtual one.

[Vehicle Attitude Stabilizing Control]

Figure 13:
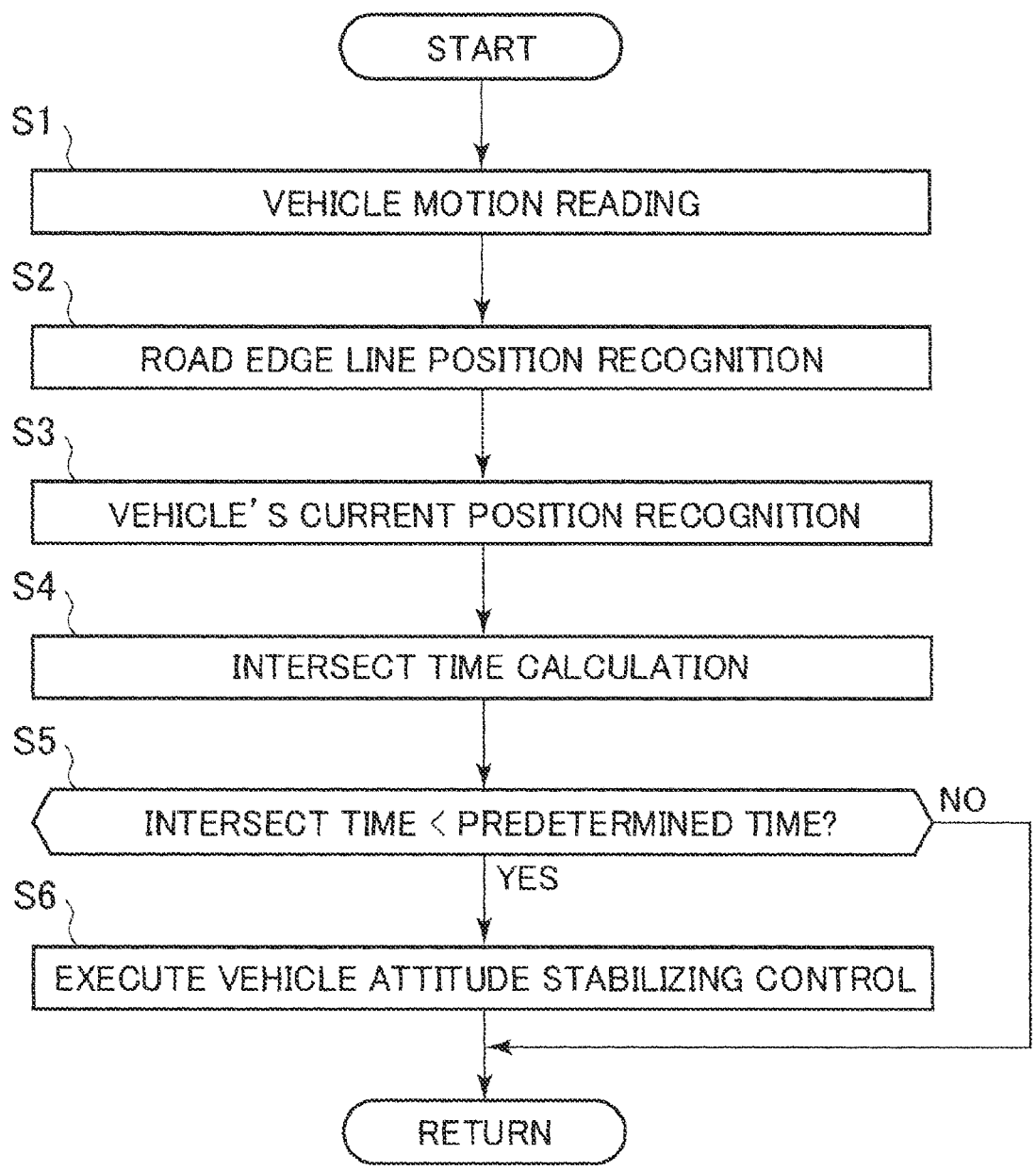
FIG. 13 is a flowchart showing processing for judging whether vehicle attitude stabilizing control is necessary, which is executed by the electronic control unit of the Embodiment 1.

FIG. 13 is a flowchart showing processing for judging whether vehicle attitude stabilizing control is necessary, which is executed by the electronic control unit 10 of the Embodiment 1. While the vehicle is traveling, the processing is repeatedly executed, for example, with a computation period of approximately 10 milliseconds.

In Step S1, the vehicle attitude stabilizing control unit 21 reads in detection values including vehicle speed, longitudinal acceleration, lateral acceleration, yaw rate, steering angle, and steering torque, received from the vehicle motion detector 11.

In Step S2, the travel-path defining line recognition unit 22 recognizes a position of the travel-path defining line from the image of the view ahead of the ego vehicle, which is received from the travel environment recognition system 1.

In Step S3, the vehicle's current position recognition unit 23 recognizes the vehicle's current position which is the forward end of the vehicle as viewed in the traveling direction of the ego vehicle. The vehicle's current position recognition unit 23 also obtains a traveling-direction virtual line extending from the ego vehicle in the traveling direction.

In Step S4, the intersect time calculation unit 24 computes an intersect time, namely, a time period in which the ego vehicle travels at current speed from the vehicle's current position to an intersection of the traveling-direction virtual line and the travel-path defining line. The virtual travel-path defining line calculation unit 25 calculates a virtual travel-path defining line. The virtual travel-path defining line is a tangent of the travel-path defining line at a point close to a vehicle's estimated position. The vehicle's estimated position is, for example, an intersection of the traveling-direction virtual line and the travel-path defining line.

In Step S5, the activation necessity judgment unit 26 makes a judgment as to whether the intersect time is shorter than a predetermined time. If the intersect time is shorter than the predetermined time, the routine advances to Step S6. If the intersect time is equal to or longer than the predetermined time, the routine ends. This is because the feeling of strangeness is given to the driver if a control amount is provided before the driver actually drives along the travel-path defining line ahead of the vehicle when the intersect time is longer than the predetermined time.

In Step S6, the vehicle attitude stabilizing control unit 21 activates the electrically-assisted power steering 2 and/or the hydraulic brake unit 3 according to a yaw moment control amount, applies yaw moment and/or deceleration to the vehicle, and executes the vehicle attitude stabilizing control. The vehicle attitude stabilizing control unit 21 uses one or more of the detection values including the vehicle speed, longitudinal acceleration, lateral acceleration, yaw rate, steering angle, and steering torque, which are read in at Step S1, to execute the vehicle attitude stabilizing control.

(Details of the Vehicle Attitude Stabilizing Control)

Figure 14:
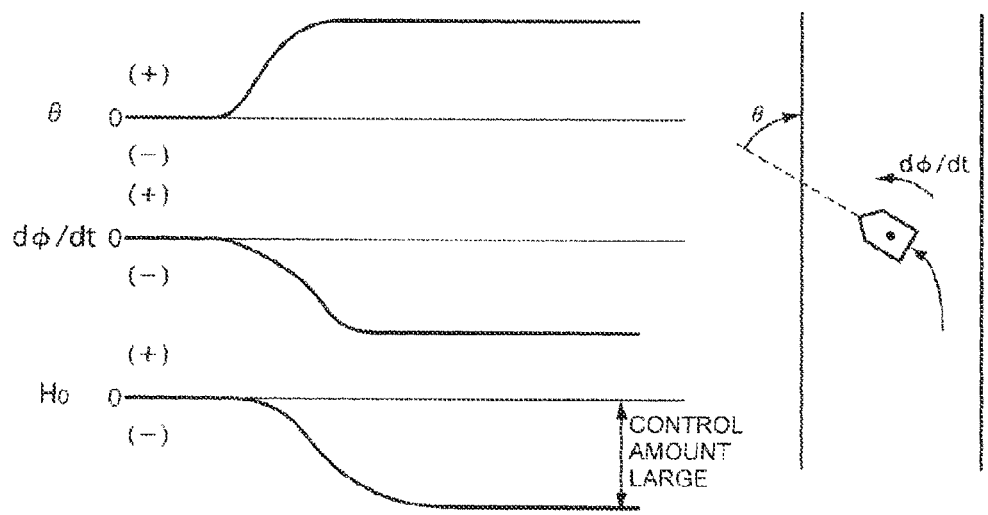
FIG. 14 is a pattern diagram showing the ego vehicle turning toward a travel-path defining line.

Details of the vehicle attitude stabilizing control processing will be explained below. FIG. 14 is a pattern diagram showing the ego vehicle turning toward the travel-path defining line. FIG. 14 shows a state in which the ego vehicle turns in a direction toward the travel-path defining line while traveling on a straight roadway. A sign of a yaw rate $d\phi/dt$ of the ego vehicle is defined as positive when the vehicle is turning right, negative when the vehicle is turning left, and zero when the vehicle is parallel to the travel-path defining line. In view of relationship between the yaw rate $d\phi/dt$ and the formed angle $\theta$ in the situation illustrated in FIG. 14, the yaw rate $d\phi/dt$ changes into negative since the vehicle is turning left, and the formed angle $\theta$ into positive. The sign of the yaw rate $d\phi/dt$ and that of the formed angle $\theta$ disagree with each other.

Figure 15:
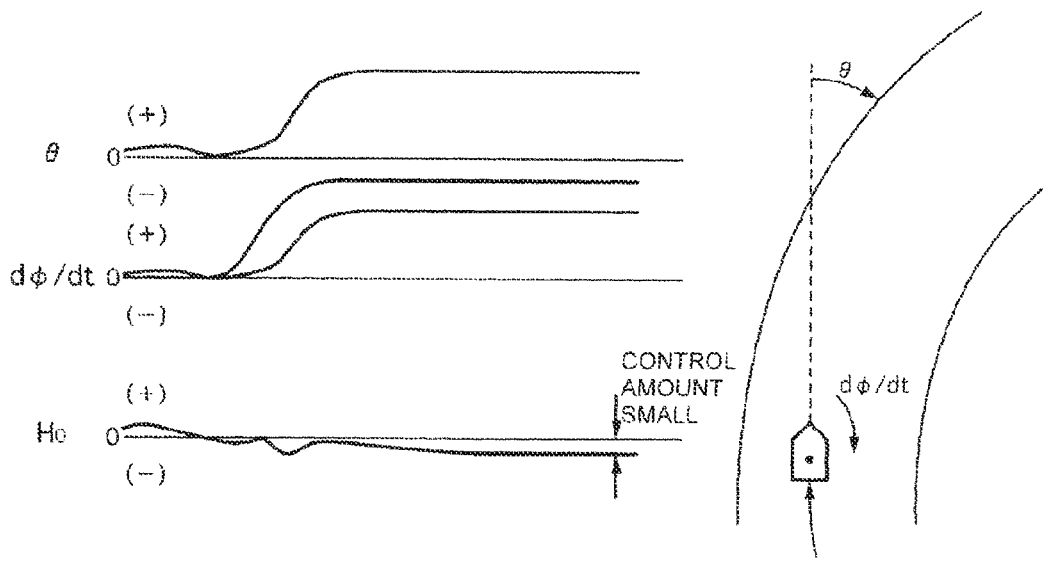
FIG. 15 is a pattern diagram showing the ego vehicle traveling on a curved roadway and turning in a direction away from the travel-path defining line.

FIG. 15 is a pattern diagram showing the ego vehicle traveling on a curved roadway and turning in a direction away from the travel-path defining line. In the situation illustrated in FIG. 15, since the travel path curves to the right, the traveling direction (traveling-direction virtual line) of the ego vehicle intersects with the travel-path defining line on the left. When the driver becomes aware of the curve and turns the steering wheel to the right, the formed angle $\theta$ changes into positive, whereas the sign of the yaw rate $d\phi/dt$ of the ego vehicle is positive because of the right turn, which agrees with the sign of the formed angle $\theta$. The following description explains relationship between the agreement/disagreement of signs of the yaw rate $d\phi/dt$ and the formed angle $\theta$ and the control amount.

As illustrated in FIG. 14, for example, when the vehicle turns toward the travel-path defining line while traveling straight, the vehicle is hardly in a stable attitude. In this case, yaw moment should be applied in a direction away from the travel-path defining line. Even if the traveling-direction virtual line and the travel-path defining line intersect with each other on a curved roadway as illustrated in FIG. 15, it can be considered that the vehicle attitude is stable if the driver operates the steering wheel, and the turning direction of the ego vehicle is the same as the curved roadway.

It is therefore desired to impart a yaw moment control amount for making stable (stabilizing) the vehicle attitude upon consideration of the foregoing travel motions. Relationship between the yaw rate ($d\phi/dt$) and vehicle speed V is expressed as follows:

$$(d\phi/dt)=V/r$$

where r denotes a turning radius. Therefore, the following is true:

$$1/r=(d\phi/dt)/V$$

where ($1/r$) is curvature. The curvature is a value indicative of a turning state of the vehicle, regardless of vehicle speed, and can be therefore handled in the same manner as the formed angle $\theta$.

The evaluation function Ho(t) at a time t, which is obtained in light of the foregoing matters, is set as follows:

$$Ho(t)=A\{(d\phi/dt)/V\}(t)-B\theta(t)$$

where A and B are constants.

The evaluation function Ho(t) represents the yaw moment control amount which should be imparted according to difference between the turning condition $[A\{(d\phi/dt)/V\}(t)]$ of the ego vehicle and the condition of the actual travel-path defining line. If the evaluation function Ho(t) indicates a large positive value while the vehicle is turning right, it is necessary to apply a left yaw moment. It is then required to apply a braking force to the left wheel or execute steering torque control which facilitates a left turn. If the evaluation function Ho(t) indicates a negative value with a large absolute value while the vehicle is turning left, it is necessary to apply a right yaw moment. It is therefore required to apply a braking force to the right wheel or execute steering torque control which facilitates a right turn.

Using the evaluation function Ho(t) eliminates the feeling of strangeness because the value of the evaluation function Ho(t) is small, and the yaw moment control amount to be imparted is also small when the driver drives along the travel-path defining line. If the driver drives toward the travel-path defining line, the value of the evaluation function Ho(t) is large, and the yaw moment control amount to be imparted is also large. This firmly secures the stability of the vehicle attitude.

As a comparative example to be compared with the invention according to the Embodiment 1, the following description explains a technology of calculating a target yaw rate by dividing the formed angle between a travel locus along the recognized travel-path defining line and the traveling-direction virtual line by an arrival time which is time that elapses before arrival to the travel-path defining line. As in the comparative example, if a value resulted from the division by the arrival time is used as the yaw moment control amount, the yaw rate is gradually corrected in the process where the vehicle approaches the travel-path defining line. This causes the problem that it takes time until a travel motion along the travel-path defining line is achieved.

According to the Embodiment 1, the yaw moment control amount is imparted according to the evaluation function Ho(t) based on difference between the curvature ($1/r$) indicative of a current turning state of the vehicle and the formed angle $\theta$. For that reason, it is output such a control amount that the vehicle immediately becomes parallel to the travel-path defining line before the vehicle actually reaches the travel-path defining line, regardless of distance to the travel-path defining line (regardless of the intersect time). This enables highly safe control. Furthermore, since the control amount is computed using the relationship between the curvature and the formed angle $\theta$, when control is not required as in a situation where the vehicle travels along the travel-path defining line, the vehicle attitude stabilizing control does not intervene even if the formed angle $\theta$ is created, so that the driver is not given the feeling of strangeness.

Figure 16:
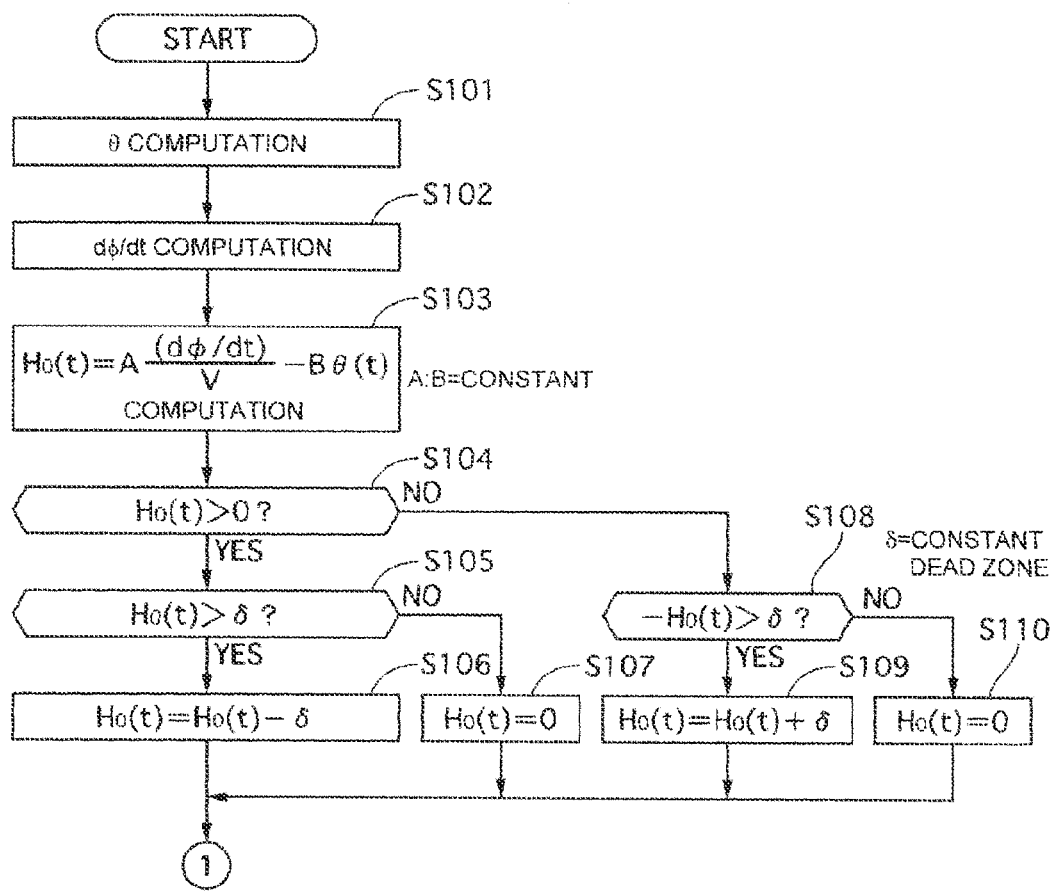
FIG. 16 is a flowchart showing vehicle attitude stabilizing control processing of the Embodiment 1.
Figure 17:
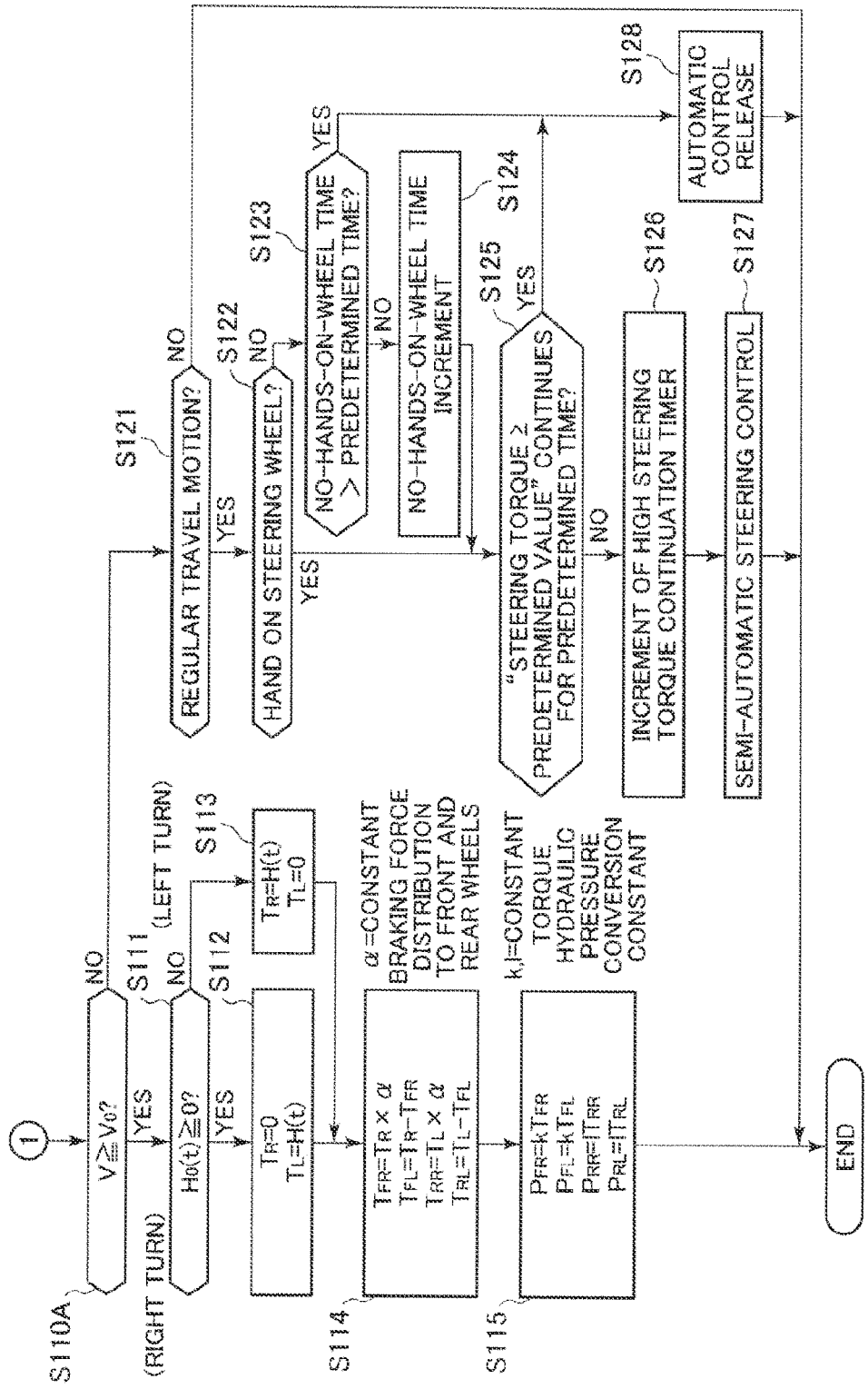
FIG. 17 is a flowchart showing the vehicle attitude stabilizing control processing of the Embodiment 1.

FIGS. 16 and 17 are flowcharts showing the vehicle attitude stabilizing control processing of the Embodiment 1. The flow relates to control processing executed by the vehicle attitude stabilizing control unit 21 when it is judged that the vehicle attitude stabilizing control is necessary in the step shown in FIG. 13, which judges the necessity of the vehicle attitude stabilizing control.

Step S101 computes the formed angle $\theta$ between the traveling direction of the ego vehicle and the travel-path defining line. More specifically, Step S101 obtains the formed angle between the traveling-direction virtual line and the virtual travel-path defining line, which are calculated in Steps S3 and S4 of FIG. 13.

Step S102 computes the yaw rate ($d\phi/dt$) of the ego vehicle. The yaw rate may be a yaw rate sensor value detected by the vehicle motion detector 11. The yaw rate may be computed from vehicle speed or steering angle according to a vehicle motion model. There is no particular limitation.

Step S103 computes the evaluation function Ho(t) from the formed angle $\theta$, the yaw rate ($d\phi/dt$), and the vehicle speed V.

Step S104 makes a judgment as to whether the evaluation function Ho(t) is positive. If the evaluation function Ho(t) is positive, the routine proceeds to Step S105. If the evaluation function Ho(t) is zero or smaller, the routine advances to Step S108.

Step S105 makes a judgment as to whether the evaluation function Ho(t) is larger than a predetermined value $\delta$ indicative of a dead band which is set in advance, and if the evaluation function Ho(t) is larger, the routine proceeds to Step S106. If the evaluation function Ho(t) is smaller than the predetermined value $\delta$, the routine advances to Step S107.

Figure 18:
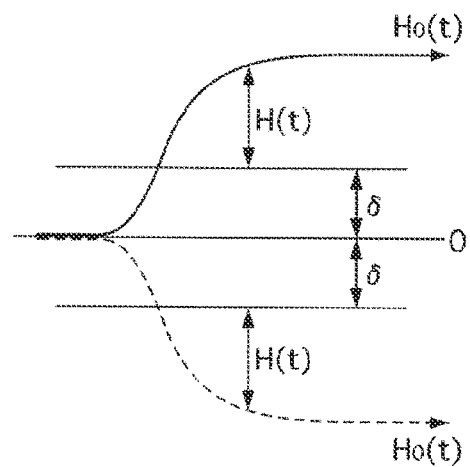
FIG. 18 is a pattern diagram showing relationship between an evaluation function Ho(t) and a predetermined value δ according to the Embodiment 1.

Step S106 sets the control amount H(t) at a value obtained by subtracting the predetermined value $\delta$ from the evaluation function Ho(t). FIG. 18 is a pattern diagram showing relationship between the evaluation function Ho(t) and the predetermined value $\delta$. A value of excess of the evaluation function Ho(t) over the predetermined value $\delta$ is computed as the control amount H(t).

Step S107 sets the control amount H(t) at zero.

Step S108 makes a judgment as to whether a value obtained by multiplying the evaluation function Ho(t) by minus (the evaluation function Ho(t) is a negative value and turns into a positive value if being multiplied by minus) is larger than the predetermined value $\delta$. If the value is larger, the routine moves to Step S109. If the value is smaller than the predetermined value $\delta$, the routine proceeds to Step S110.

Step S109 sets the control amount H(t) at a value obtained by adding the predetermined value δ to the evaluation function Ho(t).

Step S110 sets the control amount H(t) at zero.

Step S110A makes a judgment as to whether the vehicle speed is equal to or higher than predetermined vehicle speed Vo. If the vehicle speed is equal to or higher than the predetermined vehicle speed Vo, it is judged that the yaw moment control using a brake braking torque is effective. The routine then advances to Step S111. If the vehicle speed V is lower than the predetermined vehicle speed Vo, it is judged that the yaw moment control by the steering rather than the brake is effective. The routine then moves to Step S121.

Step S111 makes a judgment as to whether the control amount H(t) is equal to or larger than zero. If the control amount H(t) is equal to or larger than zero, the routine proceeds to Step S112. If the control amount H(t) is negative, the routine proceeds to Step S113.

In Step S112, it can be judged that a right turn needs to be suppressed. A right-wheel base control amount TR is thus set at zero, and a left-wheel base control amount TL at H(t).

In Step S113, it can be judged that a left turn needs to be suppressed. The right-wheel base control amount is set at H(t), and the left-wheel base control amount TL at zero.

Step S114 calculates the braking torque with respect to each wheel according to the following relational expressions.

Front-right wheel braking torque TFR=TR×α
Rear-right wheel braking torque TRR=TR−TFR
Front-left wheel braking torque TFL=TL×α
Rear-left wheel braking torque TRL=TL−TFL where α is a constant and a value that is set according to brake force distribution to the front and rear wheels.

Step S115 calculates a wheel-cylinder hydraulic pressure of each wheel according to the following relational expressions.

Front-right wheel cylinder hydraulic pressure PFR=K×TFR
Front-left wheel cylinder hydraulic pressure PFL=K×TFL
Rear-right wheel cylinder hydraulic pressure PRR=L×TRR
Rear-left wheel cylinder hydraulic pressure PRL=L×TRL where K and L are constants and conversion constants for converting torque into hydraulic pressure.

Step S121 makes a judgment as to whether the vehicle is in a regular travel motion. If it is judged that the vehicle is in the regular travel motion, the routine proceeds to Step S122. In cases other than the foregoing state (post-collision state, spinning state, a state where the vehicle departs from the road surface), the present control flow is terminated.

Step S122 makes a judgment as to whether a hand is on the steering wheel. If it is judged that a hand is on the steering wheel, the routine advances to Step S125. If it is judged that no hand is on the steering wheel, the routine moves to Step S123. Whether a hand is on the steering wheel may be checked, for example, by analyzing inertia of the steering wheel on the basis of resonance frequency components of a torque sensor or by providing a touch sensor or the like to the steering wheel to judge if a hand is on the wheel.

Step S123 makes a judgment as to whether a no-hands-on-wheel time exceeds predetermined time. If the no-hands-on-wheel time exceeds the predetermined time, the routine moves to Step S128 where automatic control release is executed. If the no-hands-on-wheel time does not exceed the predetermined time, the routine advances to Step S124 where the no-hands-on-wheel time is incremented. The routine then moves to Step S125. If automatic steering is allowed while no hand is on the steering wheel, the driver might overly rely on the present control system and lose attention during driving.

Step S125 makes a judgment as to whether a state in which the steering torque is equal to or higher than a predetermined value continues for predetermined time. If such a state continues for the predetermined time, it is judged that the driver steers the vehicle with the intention, and the routine moves to Step S128 where the automatic control release is carried out. When the state in which the steering torque is equal to or larger than the predetermined value does not continue for the predetermined time, namely, when the steering torque is low or not continuously applied even if high, the routine proceeds to Step S126 where a high steering torque continuation timer is incremented.

Step S127 executes semi-automatic steering control. The semi-automatic steering control is control which carries out automatic steering according to the travel motion of the vehicle, regardless of the driver's intention, and switches the automatic steering control to regular steering assist control when the no-hands-on-wheel state is confirmed or a high steering torque is applied in a continuous manner. According to the automatic steering control, a target steering angle and the target yaw rate for achieving the control amount H(t) are set. Electric motor control switches from torque control for applying an assist torque to rotation angle control, and an activate command is outputted to the electric motor so as to turn the steering wheel up to the target steering angle according to target steering-wheel turning speed.

Figure 19:
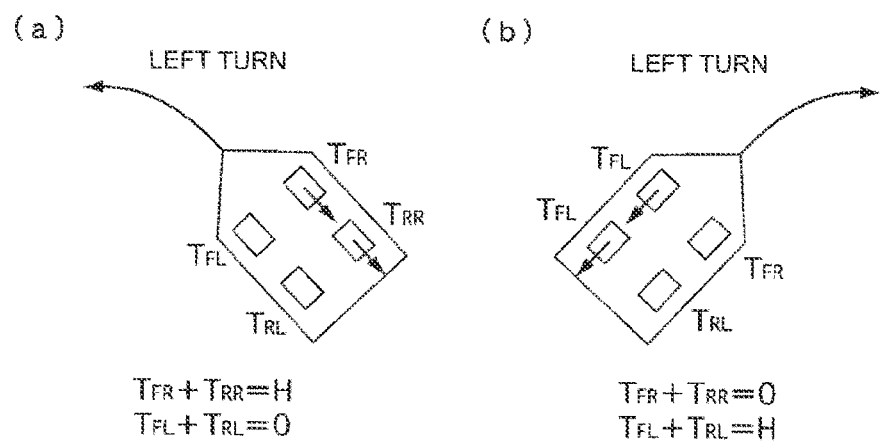
FIG. 19 is a schematic explanatory view showing relationship of braking forces applied to suppress the turn of the vehicle when the vehicle is turning at a predetermined or higher vehicle speed according to the Embodiment 1.

FIG. 19 is a schematic explanatory view showing relationship between braking forces applied to suppress the turning when the vehicle turns at predetermined or higher vehicle speed according to the Embodiment 1. When the control amount H(t) is positive and indicates the right turn state, it is required to apply the left yaw moment. When the control amount H(t) is negative and indicates the left turn state, it is required to apply the right yaw moment. The supply of the wheel-cylinder hydraulic pressure with respect to each wheel, which is calculated in Step S115, stabilizes the vehicle attitude and promptly applies the yaw moment which makes the vehicle parallel to the travel-path defining line.

Figure 20:
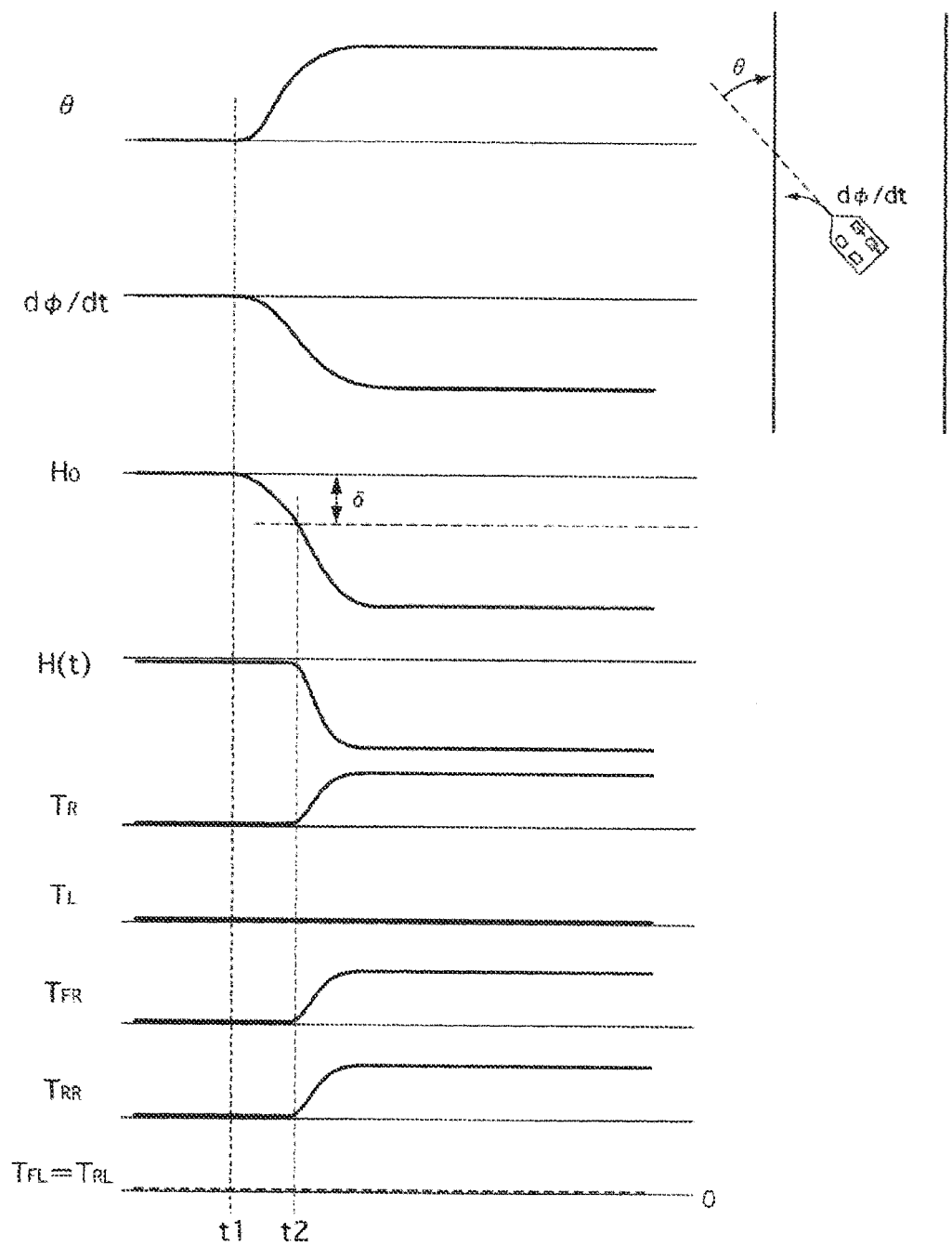
FIG. 20 is a timeline chart of a situation where the vehicle attitude stabilizing control processing is executed on a straight roadway according to the Embodiment 1.

FIG. 20 is a timeline chart of a situation where the vehicle attitude stabilizing control processing is executed on a straight roadway according to the Embodiment 1. FIG. 20 shows a situation where the vehicle turns left due to a disturbance, such as a crosswind, while traveling straight, and the formed angle is created in the left-side travel-path defining line.

At time t1, the left yaw rate dφ/dt is generated by crosswind, and simultaneously, the formed angle θ starts being created in the travel-path defining line on the left. The value of the evaluation function Ho(t) also starts changing. In this situation, because of the left turn state which increases the formed angle, the sign of the yaw rate dφ/dt and that of the formed angle θ disagree with each other. The evaluation function Ho(t) changes so that the absolute value is large on the negative side. The vehicle attitude stabilizing control is not executed until the absolute value becomes larger than the predetermined value δ. This suppresses an excessive control intervention and thus prevents the driver from having the feeling of strangeness.

At time t2, the evaluation function Ho(t) becomes equal to or larger than the predetermined value δ, and the control amount H(t) is calculated. Thereafter, the right-wheel base control amount TR is calculated, and the front right-wheel braking torque TFR and the rear right-wheel braking torque TRR are calculated. At this time, the front left-wheel braking torque TFL and the front left-wheel braking torque TRL are set at zero. The vehicle is thus applied with the right yaw moment and makes a turn so that the vehicle traveling direction (traveling-direction virtual line) is parallel to the direction of the travel-path defining line.

Figure 21:
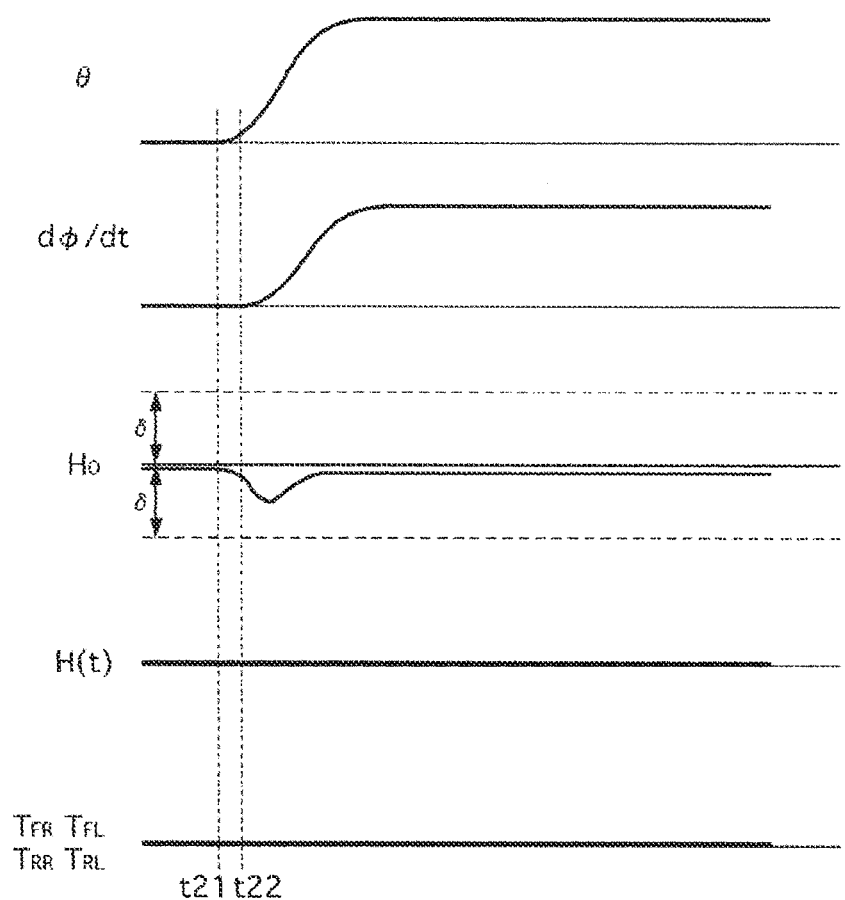
FIG. 21 is a timeline chart showing an active condition of the vehicle attitude stabilizing control processing which is executed on a curved roadway at a predetermined or higher vehicle speed according to the Embodiment 1.

FIG. 21 is a timeline chart showing an active condition of the vehicle attitude stabilizing control processing executed on a curved roadway at predetermined or higher vehicle speed according to the Embodiment 1. FIG. 21 shows a situation where the driver properly operates the steering wheel on the curved roadway and drives along the travel-path defining line.

At time t21, the travel-path defining line of the curved roadway appears ahead of the vehicle, and the formed angle θ starts being created between the travel-path defining line and the vehicle traveling direction (traveling-direction virtual line). At this point of time, the vehicle does not yet enter the curve, so that the driver does not operate the steering wheel, and the yaw rate dφ/dt is not generated. Although the evaluation function Ho(t) begins indicating negative values, these values are smaller than the predetermined value δ.

At time t22, the driver operates the steering wheel to drive along the curved roadway, the yaw rate dφ/dt then starts being generated in the vehicle. The sign of yaw rate dφ/dt agrees with that of the formed angle θ, and the absolute value of the evaluation function Ho(t) becomes small. If the vehicle travels along the travel-path defining line, the value of the evaluation function Ho(t) is substantially zero, and remains within a range of plus or minus δ. The vehicle attitude stabilizing control is therefore basically not executed. It is thus possible to avoid the feeling of strangeness which is caused by unnecessary control intervention.

As described above, the Embodiment 1 makes it possible to achieve the operation and advantages listed below.

(1) The vehicle control system includes the travel-path defining line recognition unit 22 (travel-path defining line recognition unit) configured to recognize the travel-path defining line of a travel path from information about an area in a traveling direction of the ego vehicle;

the vehicle's current position recognition unit 23 (traveling-direction virtual line recognition unit) configured to recognize the traveling-direction virtual line extending from the ego vehicle in the traveling direction; and the vehicle attitude stabilizing control unit 21 (vehicle attitude stabilizing control unit) configured to impart the control amount H(t) (yaw moment control amount) according to the formed angle θ between the traveling-direction virtual line and the travel-path defining line.

It is then possible to output such a control amount that the ego vehicle becomes parallel to the travel-path defining line before the ego vehicle actually reaches the travel-path defining line, regardless of distance between the ego vehicle and the travel-path defining line. This enables highly safe control.

(2) The vehicle attitude stabilizing control unit 21 imparts the yaw moment control amount through the brake control which applies the braking torque to the wheels.

Since the brake control is used to impart the yaw moment control amount, the yaw moment control amount can be imparted without giving the driver such feeling of strangeness as if the steering wheel moves. Furthermore, since the vehicle is decelerated by generation of the braking torque, safer control can be achieved.

(3) The vehicle attitude stabilizing control unit 21 imparts the yaw moment control amount through the steering turning control which controls the steering turning angle.

Since the steering turning control is used to impart the yaw moment control amount, highly-responsive yaw moment control can be achieved. In a low vehicle-speed area, it is difficult to generate a sufficient yaw moment by imparting the yaw moment control amount using the brake. If the steering turning control is used, however, a sufficient yaw moment can be generated even in the low vehicle-speed area.

(4) The vehicle attitude stabilizing control unit 21 imparts the yaw moment control amount according to an intersect angle which is difference between the formed angle between the traveling-direction virtual line and the travel-path defining line and the curvature according to the turning radius of the ego vehicle.

The control amount is computed using the relationship between the curvature and the formed angle θ. For this reason, under a situation where control is unnecessary as in a case where the vehicle travels along the travel-path defining line, the vehicle attitude stabilizing control does not intervene even if the formed angle θ is created. The driver is therefore not given the feeling of strangeness.

(5) The vehicle attitude stabilizing control unit 21 imparts the yaw moment control amount H(t) when the evaluation function Ho(t) becomes equal to or larger than the predetermined value δ.

It is thus possible to avoid the feeling of strangeness which is caused by the control intervention being carried out as the result of generation of a small control amount.

(6) The intersect time calculation unit 24 (intersect time calculation unit) is provided, which calculates the intersect time elapsed to reach an intersection point of the traveling-direction virtual line and the travel-path defining line, on the basis of the vehicle speed V. When the intersect time becomes shorter than the predetermined time, the vehicle attitude stabilizing control unit 21 imparts the yaw moment control amount.

If the formed angle θ is created in a position way ahead of the vehicle, the driver does not yet operate the steering wheel, and the vehicle is unlikely to depart from a traffic lane or the like. In this case, the yaw moment control amount is not imparted, so that the driver is not given the feeling of strangeness.

(7) The vehicle attitude stabilizing control unit 21 imparts the yaw moment control amount through the brake control which applies the braking torque to the wheels, when the vehicle speed V is equal to or higher than the predetermined value. When the vehicle speed is lower than the predetermined value, the vehicle attitude stabilizing control unit 21 imparts the yaw moment control amount through the steering turning control which controls the steering turning angle.

If the vehicle drives at high speed, the brake control is used to impart the yaw moment control amount. It is then possible to impart the yaw moment control amount while decelerating the vehicle, which enables highly safe control. If the vehicle drives at low speed, the steering turning control which is more highly responsive than the brake control is used to impart the yaw moment control amount. This makes it possible to immediately make the vehicle parallel to the travel-path defining line.

(8) The travel-path defining line recognition unit 22 is a stereo camera which measures distance using the disparity which occurs when the plurality of cameras 310a and 310b take images of the same object.

It is therefore possible to stereoscopically perceive distance and obstacle ahead of the vehicle, and set control gains which differ between obstacles, such as guardrails, and white lines. If there is the possibility of collision with an obstacle, a larger gain is set to achieve highly safe control.

Embodiment 2

Figure 22:
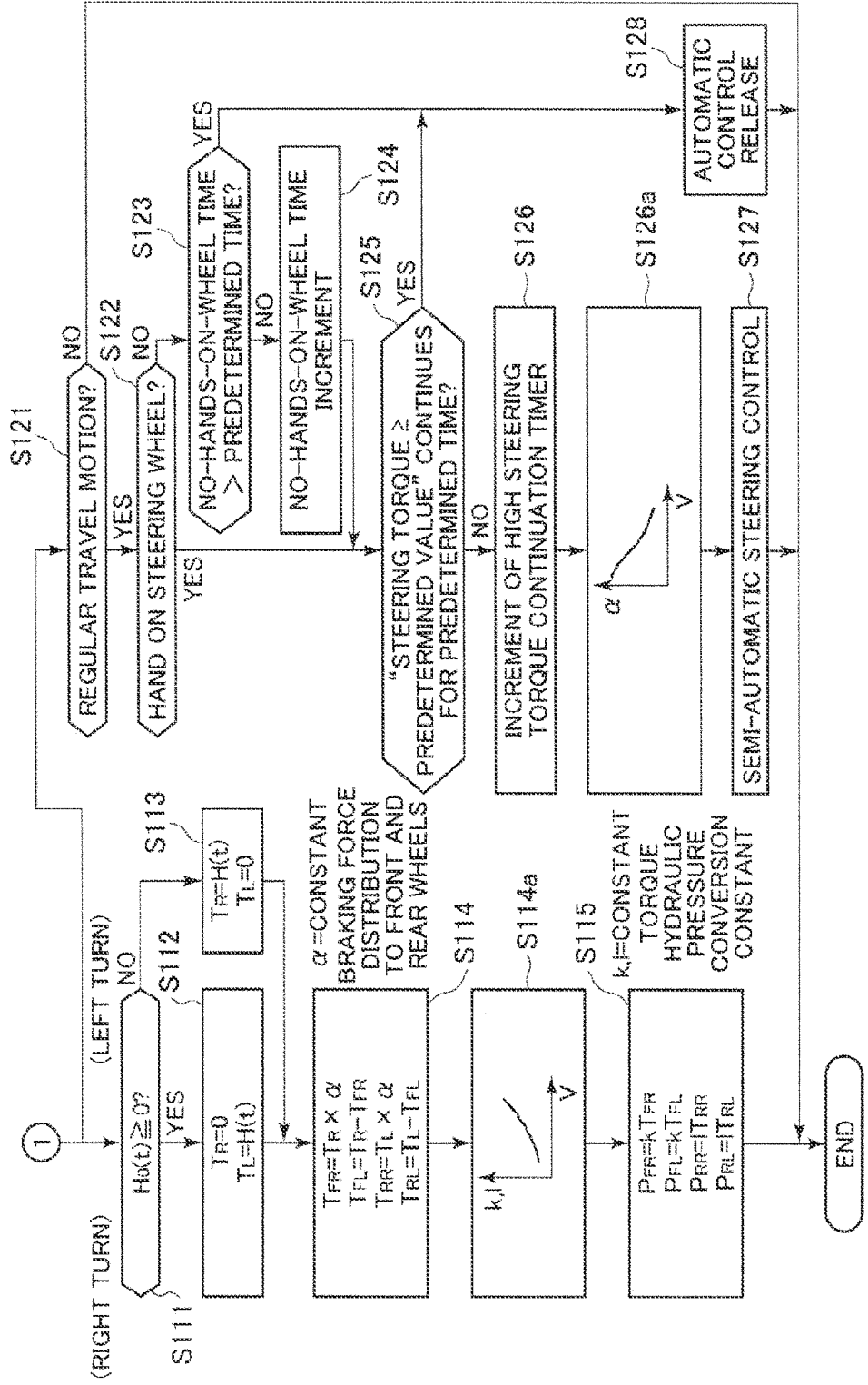
FIG. 22 is a flowchart showing vehicle attitude stabilizing control processing according to an Embodiment 2.

Embodiment 2 will now be described. As the Embodiment 2 has a similar basic configuration to the Embodiment 1, the following description refers to different points only. FIG. 22 is a flowchart showing vehicle attitude stabilizing control processing according to the Embodiment 2. The Embodiment 1 switches control between the brake control and the semi-automatic control by the steering, depending on whether the vehicle speed V is equal to or higher than the predetermined vehicle speed Vo. In contrast, the Embodiment 2 executes both the brake control and the semi-automatic control. Control amounts of the brake control and the semi-automatic control are regulated according to the vehicle speed.

Step S114a calculates constants k and l which are set at values increased in proportion to the vehicle speed V. Step S115 calculates the wheel-cylinder hydraulic pressure with respect to each wheel, which is decreased as the vehicle speed V is decreased.

Step S126a calculates a control gain $\alpha'$ which is set at a value decreased as the vehicle speed V is increased. Step S127 then sets a target steering angle and a target yaw rate by using a value obtained by multiplying the control amount H(t) by the gain $\alpha'$, to thereby calculate the target steering angle and the target yaw rate which are decreased as the vehicle speed is increased.

As described above, the following operation and advantages can be achieved by the Embodiment 2.

(9) The vehicle attitude stabilizing control unit 21 increases the yaw moment control amount imparted through the brake control which applies the braking torque to the wheels, as the vehicle speed V is increased, and increases the yaw moment control amount imparted through the steering turning control which controls the steering turning angle, as the vehicle speed is decreased.

In a high vehicle-speed area, while highly safe control with deceleration is carried out by prioritizing the brake control, responsiveness can be further improved by the steering control. In a low vehicle-speed area, while the control with high responsiveness is carried out by prioritizing the steering control, highly safe control can be achieved because deceleration is applied by the brake control.

The above-discussed embodiment thus enables correction of dissociation between the condition of the travel-path defining line and the driver's steering condition, regardless of distance between the ego vehicle and the travel-path defining line. The vehicle is therefore promptly caused to travel along the travel-path defining line, which provides the vehicle control system with high safety.

The vehicle control system according to one aspect of the invention includes the travel-path defining line recognition unit which recognizes the travel-path defining line on the travel path from the information about the zone in the traveling direction of the ego vehicle; and the vehicle attitude stabilizing control unit which recognizes the traveling-direction virtual line extending from the ego vehicle in the traveling direction, and imparts such a yaw moment control amount that the ego vehicle becomes parallel to the travel-path defining line according to the formed angle between the traveling-direction virtual line and the travel-path defining line, regardless of distance between the position at which the traveling-direction virtual line and the travel-path defining line intersect with each other and the ego vehicle.

The vehicle control system according to one aspect of the invention includes a stereo camera which measures distance using the disparity which occurs when the plurality of cameras take images of the same object, and recognizes the travel-path defining line of the travel path; and the vehicle attitude stabilizing control unit which recognizes the traveling-direction virtual line extending from the ego vehicle in the traveling direction, and imparts such a yaw moment control amount that the ego vehicle becomes parallel to the travel path defining line according to the formed angle between the traveling direction virtual line and the travel-path defining line, regardless of distance between the position at which the traveling direction virtual line and the travel-path defining line intersect with each other and the ego vehicle.

In the vehicle control system, the vehicle attitude stabilizing control unit may be configured to impart the yaw moment control amount through the brake control which applies the braking torque to the wheels.

In the vehicle control system, the vehicle attitude stabilizing control unit may be configured to impart the yaw moment control amount through the steering turning control which controls the steering turning angle.

In the vehicle control system, there is provided a virtual travel-path defining line recognition unit which recognizes the virtual travel-path defining line which is a tangent of the travel-path defining line at the intersection point with the travel-path defining line. The vehicle attitude stabilizing control unit may be configured to impart the yaw moment control amount according to the intersect angle which is difference between the formed angle between the traveling-direction virtual line and the virtual travel-path defining line and the curvature according to the turning radius of the ego vehicle.

In the vehicle control system, the vehicle attitude stabilizing control unit may be configured to impart the yaw moment control amount when the intersect angle becomes equal to or larger than a predetermined value.

In the vehicle control system, there is provided the intersect time calculation unit which calculates the intersect time elapsed to reach the intersection of the traveling-direction virtual line and the travel-path defining line on the basis of the vehicle speed. The vehicle attitude stabilizing control unit may be configured to impart the yaw moment control amount when the intersect time becomes shorter than the predetermined time.

In the vehicle control system, the vehicle attitude stabilizing control unit may be configured to impart the yaw moment control amount through the brake control which applies the braking torque to the wheels when the vehicle speed is equal to or higher than the predetermined value, and impart the yaw moment control amount through the steering turning control which controls the steering turning angle when the vehicle speed is lower than the predetermined value.

In the vehicle control system, the vehicle attitude stabilizing control unit may be configured to increase the yaw moment control amount imparted through the brake control which applies the braking torque to the wheels as the vehicle speed is increased, and increase the yaw moment control amount imparted through the steering turning control which controls the steering turning angle as the vehicle speed is decreased.

In the vehicle control system, the travel-path defining line recognition unit may be the stereo camera which measures distance using the disparity which occurs when the plurality of cameras take images of the same object.

The foregoing description merely explains several embodiments of the invention. Those skilled in the art could easily understand that the embodiments described above may be changed or modified in various ways without substantially deviating from new teachings and advantages of the invention. Therefore, it is intended to include within the technological scope of the invention all aspects added with such changes or modifications.

The present patent application claims priority to Japanese Patent Application No. 2013-116319 filed on May 31, 2013. The entire disclosure of Japanese Patent Application No. 2013-116319 filed on May 31, 2013 including description, claims, drawings and abstract is incorporated herein by reference in its entirety.

The entire disclosure of Japanese Unexamined Patent Application Publication No. 2004-345460 (Patent Document 1) including description, claims, drawings and abstract is incorporated herein by reference in its entirety.

REFERENCE SIGNS LIST 1 travel environment recognition system
2 electrically-assisted power steering
3 hydraulic brake unit
4 brake booster
5 steering wheel
10 electronic control unit
11 vehicle motion detector
20 departure-tendency calculating unit
21 vehicle attitude stabilizing control unit
22 travel-path defining line recognition unit
24 intersect time calculation unit
25 virtual travel-path defining line calculation unit
26 activation necessity judgment unit
310 stereo camera

The invention claimed is:

1. A vehicle control system comprising:
a travel-path defining line recognition unit configured to recognize a travel-path defining line of a travel path from information about an area in a traveling direction of a vehicle to which the vehicle control system is mounted;
a virtual travel-path defining line recognition unit configured to recognize a virtual travel-path defining line which is a tangent of the travel-path defining line at an intersection point of a traveling-direction virtual line and the travel-path defining line; and
a vehicle attitude stabilizing control unit configured to recognize the traveling-direction virtual line extending from the vehicle in the traveling direction and impart such a yaw moment control amount that the vehicle travels along the travel-path defining line according to an angle formed between the traveling-direction virtual line and the travel-path defining line or between the traveling-direction virtual line and the virtual travel-path defining line,
wherein the vehicle attitude stabilizing control unit is configured to impart the yaw moment control amount based on an evaluation function using the angle formed between the traveling-direction virtual line and the virtual travel-path defining line, and a curvature of a turning radius of the vehicle.

2. The vehicle control system of claim 1, wherein the vehicle attitude stabilizing control unit is configured to impart the yaw moment control amount through brake control which applies a braking torque to wheels.

3. The vehicle control system of claim 1, wherein the vehicle attitude stabilizing control unit is configured to impart the yaw moment control amount through steering turning control which controls a steering turning angle.

4. The vehicle control system of claim 1, wherein the vehicle attitude stabilizing control unit is configured to impart the yaw moment control amount when the evaluation function becomes equal to or larger than a predetermined value.

5. The vehicle control system of claim 1, wherein
there is provided an intersect time calculation unit configured to calculate an intersect time elapsed to reach the intersection point of the traveling-direction virtual line and the travel-path defining line on the basis of vehicle speed; and
the vehicle attitude stabilizing control unit is configured to impart the yaw moment control amount when the intersect time becomes shorter than predetermined time.

6. The vehicle control system of claim 1, wherein
the vehicle attitude stabilizing control unit is configured to impart the yaw moment control amount through brake control which applies a braking torque to wheels when vehicle speed is equal to or higher than a predetermined value, and impart the yaw moment control amount through steering turning control which controls a steering turning angle when the vehicle speed is lower than a predetermined value.

7. The vehicle control system of claim 1, wherein
the vehicle attitude stabilizing control unit is configured to increase the yaw moment control amount to be imparted through brake control which applies a braking torque to wheels as vehicle speed is increased, and increase the yaw moment control amount to be imparted through steering turning control which controls a steering turning angle as the vehicle speed is decreased.

8. The vehicle control system of claim 1, wherein the travel-path defining line recognition unit is a stereo camera which measures distance using disparity which occurs when a plurality of cameras take images of the same object.

9. A vehicle control system comprising:
a stereo camera configured to measure distance using disparity which occurs when a plurality of cameras take images of the same object, and recognize a travel-path defining line of a travel path;
a virtual travel-path defining line recognition unit configured to recognize a virtual travel-path defining line which is a tangent of the travel-path defining line at an intersection point of a traveling-direction virtual line and the travel-path defining line; and
a vehicle attitude stabilizing control unit configured to recognize the traveling-direction virtual line extending, in a traveling direction, from a vehicle to which the vehicle control system is mounted, and impart such a yaw moment control amount that the vehicle travels along the travel-path defining line according to an angle formed between the traveling-direction virtual line and the travel-path defining line or between the traveling-direction virtual line and the virtual travel-path defining line,
wherein the vehicle attitude stabilizing control unit is configured to impart the yaw moment control amount based on an evaluation function using the angle formed between the traveling-direction virtual line and the virtual travel-path defining line, and a curvature of a turning radius of the vehicle.

10. The vehicle control system of claim 9, wherein the vehicle attitude stabilizing control unit is configured to impart the yaw moment control amount through brake control which applies a braking torque to wheels.

11. The vehicle control system of claim 10, wherein the vehicle attitude stabilizing control unit is configured to impart the yaw moment control amount through steering turning control which controls a steering turning angle.

12. The vehicle control system of claim 9, wherein the vehicle attitude stabilizing control unit is configured to impart the yaw moment control amount when the evaluation function becomes equal to or larger than a predetermined value.

13. The vehicle control system of claim 9, wherein
there is provided an intersect time calculation unit configured to calculate an intersect time elapsed to reach the intersection point of the traveling-direction virtual line and the travel-path defining line on the basis of vehicle speed; and
the vehicle attitude stabilizing control unit is configured to impart the yaw moment control amount when the intersect time becomes shorter than predetermined time.

14. The vehicle control system of claim 9, wherein
the vehicle attitude stabilizing control unit is configured to impart the yaw moment control amount through brake control which applies a braking torque to wheels when vehicle speed is equal to or higher than a predetermined value, and impart the yaw moment control amount through steering turning control which controls a steering turning angle when the vehicle speed is lower than the predetermined value.

15. The vehicle control system of claim 9, wherein
the vehicle attitude stabilizing control unit is configured to increase the yaw moment control amount to be imparted through brake control which applies a braking torque to wheels as vehicle speed is increased, and increase the yaw moment control amount to be imparted through steering turning control which controls a steering turning angle as the vehicle speed is decreased.

* * * * *